(No Model.) 2 Sheets—Sheet 1.
R. C. WALL.
BELT TIGHTENER.
No. 301,940. Patented July 15, 1884.
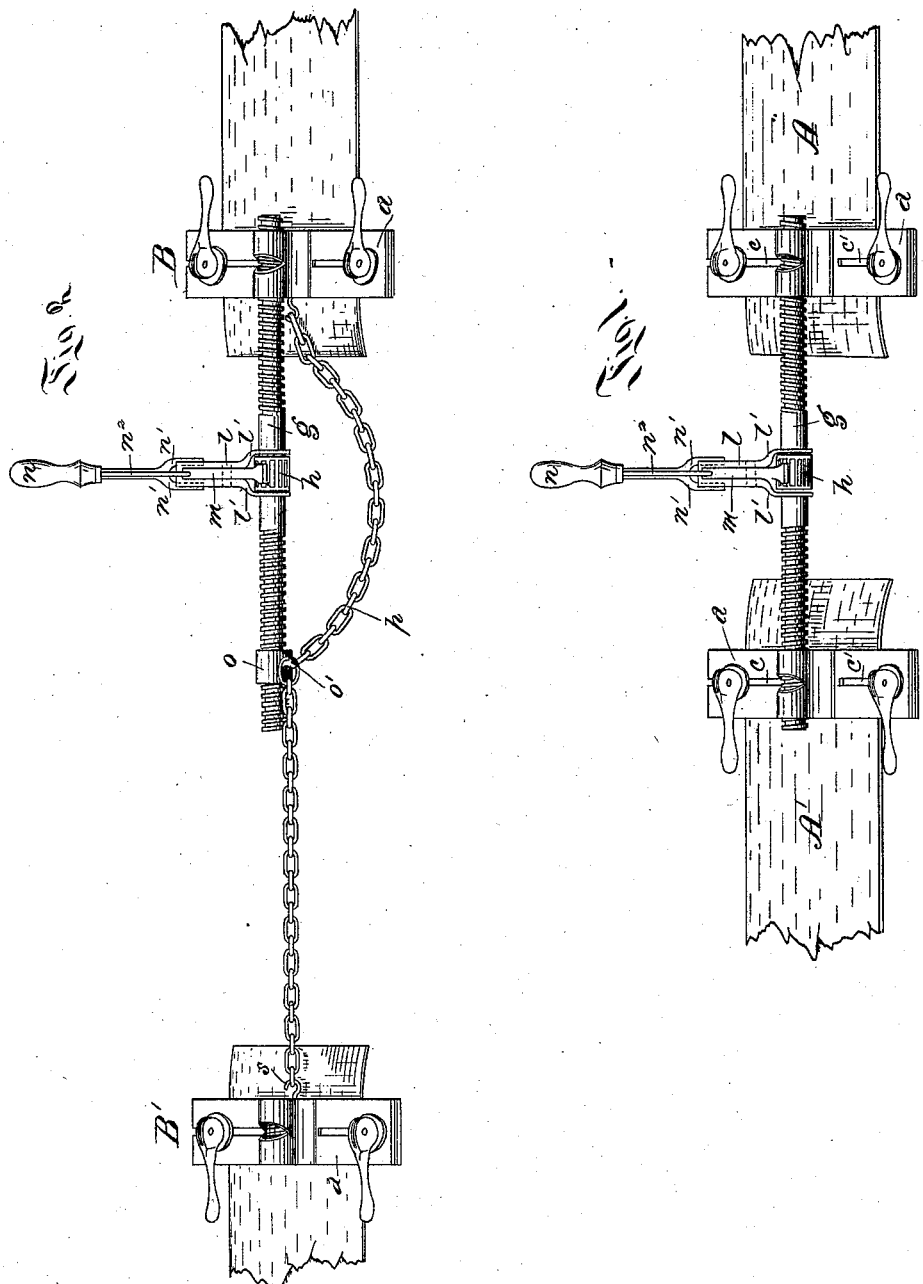
Witnesses: Inventor: Robert C. Wall.
By Attorney George H. Christy

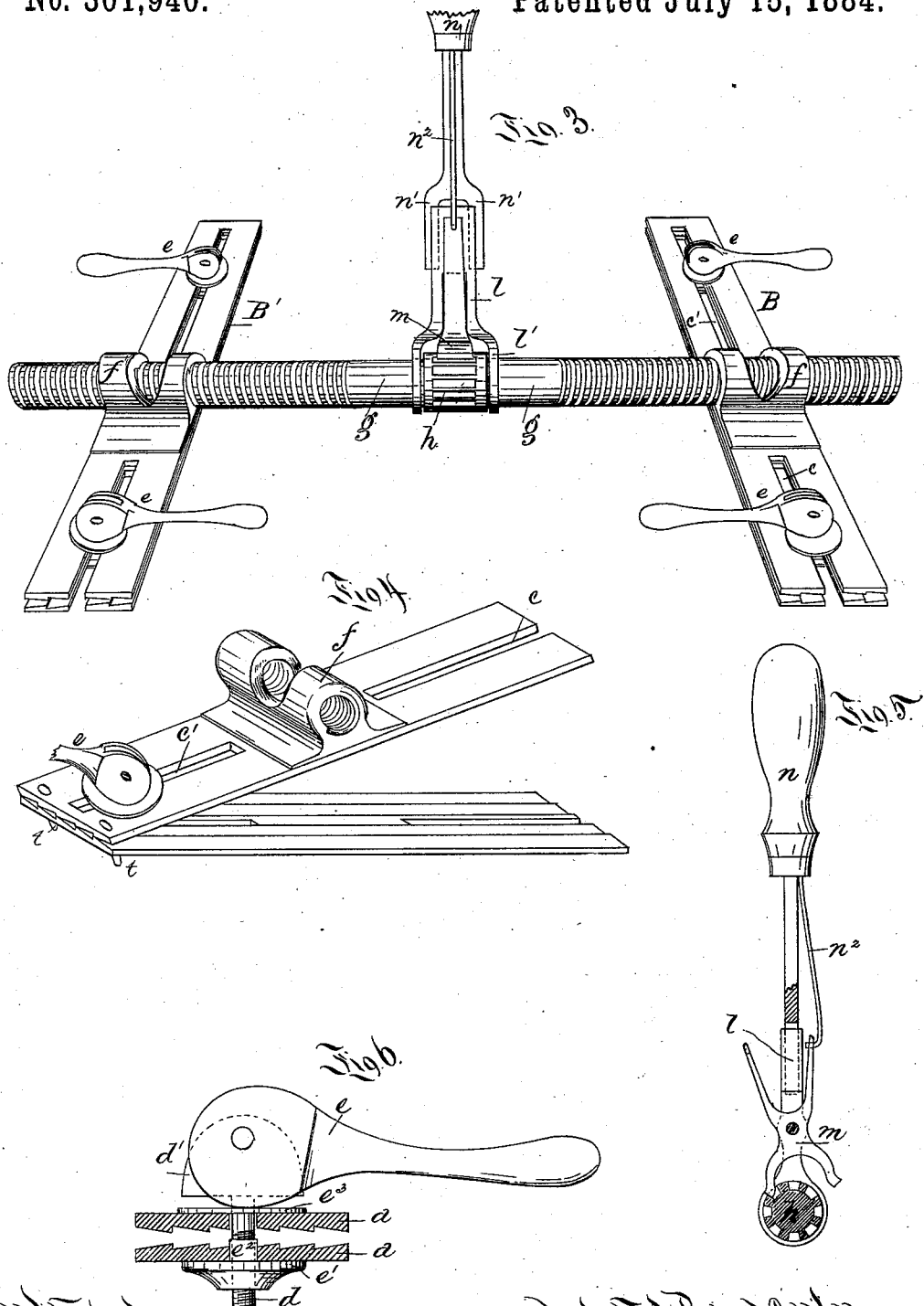

UNITED STATES PATENT OFFICE.

ROBERT C. WALL, OF ALLEGHENY, PENNSYLVANIA.

BELT-TIGHTENER.

SPECIFICATION forming part of Letters Patent No. 301,940, dated July 15, 1884.

Application filed December 28, 1883. (No model.)

*To all whom it may concern:*

Be it known that I, ROBERT C. WALL, a citizen of the United States, residing at Allegheny, county of Allegheny, State of Pennsylvania, have invented or discovered a new and useful Improvement in Belt-Tighteners; and I do hereby declare the following to be a full, clear, concise, and exact description thereof, reference being had to the accompanying drawings, making a part of this specification, in which—like letters indicating like parts—

Figure 1 is a perspective view of my belt-tightener applied to the ends of a belt. Fig. 2 is a similar view showing an attachment to be used when the ends of the belt are widely separated. Fig. 3 is an enlarged perspective view of the belt-tightener. Fig. 4 is a perspective view of one of the clamps opened to be applied to the belt. Figs. 5 and 6 are detail views.

My invention relates to a mechanism for drawing and holding together the ends of belts for the purpose of sewing or suitably fastening such ends together; and my invention consists, in general, in the construction and combination of parts, all as more fully hereinafter described and claimed.

In the drawings, A A' indicate the ends of a belt. On these ends are slipped the clamps B B', which consist of the two plates $a\ a$, having their inner faces serrated, as shown at $b$, Fig. 4. These plates are slotted at each end, as shown at $c\ c'$, the slot $c$ being open at its outer end, as shown. In these slots are placed the threaded bolts $d$, the head $d'$ of which is flattened, and is pivoted to the cam-lever $e$, bifurcated at its cam-shaped end to receive the head $d'$. The threaded end of the bolt $d$ is screwed into the nut $e'$, which is provided on its inner face with a rib, $e^2$, which fits into the slot of the lower plate, and is thereby prevented from turning. On the bolt $d$, between the plate $a$ and the cam-lever $e$, is placed a washer, $e^3$, which forms a bearing-surface for the cam of projection of the lever. To apply this clamp to a belt the cam-levers are turned up so as to slacken the pressure of the bolts on the plates $a$. The bolt $d$ in the slot $c$ is then slid out of the slot, and the plates $a$ at that end are separated, as shown in Fig. 4, and slipped onto the belt. Then the cam-lever of the belt, which has not been removed from its slot $c'$, is turned down, and the plates $a$ take sufficient grip upon the belt to hold the plates thereon until the other bolt can be slipped into place in slot $c$ and its cam-lever turned down to force together that end of the plates $a$. If the cam-levers, when turned down, do not cause the plates to take a sufficiently firm grip upon the belts, the bolt $d$ should be screwed farther into the nut $e'$ in the under side of the plates, the lever $e$ affording a handle by which the bolt $d$ can be rotated. On one end of one of the plates are fixed the pins $t$, adapted to fit into holes in the end of the other plate, and thereby hold said plates parallel when in use.

On one of the plates $a$ of each of the clamps B B' is formed a threaded socket, $f$, the thread of the socket on one clamp being a right-hand thread and that on the other being left hand. The clamps B B' are held and drawn together or separated, as may be required, by a rod, $g$, having oppositely-threaded ends, as shown. At the middle of this rod $g$, and integral therewith, is formed a ratchet, $h$, and on each side of the ratchet $h$ are placed the arms $l'$ of the lever $l$, said arms being provided with a hole, through which the rod $g$ passes.

In a slot, $l^2$, in the lever $l$ is pivoted the double pawl $m$, whereby the ratchet may be rotated.

In the edges of the lever $l$, at its upper end, are formed recesses $l^3$, into which fit the prongs $n\ n'$ of the handle $n$, on one side of which is secured one end of the spring $n^2$. The opposite end of the spring, being bent into hook shape, is adapted to fit into a hole in the ends of the double pawl $m$ and press down thereon, thereby holding one prong of the pawl away from and the other in engagement with the ratchet $h$. If it is desired to reverse the movement of the screw, the spring is disengaged from the arm of the pawl, and the handle $n$ can then be detached from the lever, reversed, and slipped into place again, and the spring adjusted in the hole of the other arm of the pawl.

It may sometimes happen that the ends of the belt are separated such a distance that the clamps cannot be placed thereon while on the rod $g$. In such an emergency one of the clamps B' is removed from the rod $g$ and secured, as above described, to one end of the belt, and the other clamp carrying the rod $g$ is secured to the other end of the belt.

On the end of the rod $g$ from which the clamp was removed is screwed a nut, $o$, provided with a hook or projection, $o'$, onto which is hooked a link of a chain, $p$, the ends of the chain being caught onto the hooks $s$ on one of the plates $a$ of each of the clamps B B'. Now, when the rod $g$ is rotated in the proper direction, the nut and clamp on the opposite ends of the rod are drawn together and the ends of the belt are drawn toward each other a corresponding amount. When the nut and clamp have been drawn together as much as possible, the hook in the clamp B is caught into one of the links of the chain, as near as possible to the opposite clamp, B'. The hook $o$ is then released from its link, and the rod $g$ is rotated so as to bring the clamp and nut out to the ends thereof, when the hook $o$ is caught into another link and the above operation repeated. These operations are repeated until the end of the rod $g$ can be screwed into the socket of the clamp B', when the device can be used in the usual way.

If necessary, the handle $n$ can be used as a wrench to turn the bolts $d$, its forked end spanning the end of the cam-lever $e$.

I claim herein as my invention—

1. In a belt-tightening device, the plates $a$, having suitable slots, in combination with the threaded bolt $d$, the cam-lever $e$, pivoted thereto, and the nut $e'$, having the ribs $e^2$, substantially as set forth.

2. In a belt-tightening device, the rod $g$, having oppositely-threaded ends, and the ratchet $h$, formed integral therewith, in combination with the lever $l$, the double pawl $m$, and the reversible handle $n$, having the spring $n^2$, substantially as set forth.

3. In a belt-tightener, the clamps B B', having hooks $s$, in combination with the rod $g$, having oppositely-threaded ends, the nut $o$, having a hook, $o'$, the chain $p$, and mechanism for rotating the rod $g$, substantially as set forth.

4. The rod having oppositely-threaded ends, and the ratchet $h$, in combination with the lever $l$, the double pawl $m$, pivoted to said lever, and the detachable and reversible handle $n$, having the spring $n^2$, substantially as set forth.

5. The ratchet $h$, in combination with the lever $l$, having recesses at its end, as described, the double pawl $m$, pivoted in a slot in said lever, the detachable and reversible handle $n$, having the prongs $n'$, adapted to fit in the recesses of the lever and forming a wrench-socket, as described, and the spring $n^2$, substantially as described.

In testimony whereof I have hereunto set my hand.

ROBERT C. WALL.

Witnesses:
R. H. WHITTLESEY,
C. M. CLARKE.